US008626396B2

United States Patent
Aoki et al.

(10) Patent No.: US 8,626,396 B2
(45) Date of Patent: Jan. 7, 2014

(54) VEHICULAR COLLISION DETECTION APPARATUS, OCCUPANT RESTRAINT SYSTEM, AND VEHICLE

(75) Inventors: Hiroshi Aoki, Tokyo (JP); Kazuya Oi, Tokyo (JP)

(73) Assignee: Takata Corporation, Tokyo (JP)

( * ) Notice: Subject to any disclaimer, the term of this patent is extended or adjusted under 35 U.S.C. 154(b) by 279 days.

(21) Appl. No.: 13/139,723

(22) PCT Filed: Oct. 26, 2009

(86) PCT No.: PCT/JP2009/068335
§ 371 (c)(1),
(2), (4) Date: Jun. 14, 2011

(87) PCT Pub. No.: WO2010/073810
PCT Pub. Date: Jul. 1, 2010

(65) Prior Publication Data
US 2011/0251760 A1   Oct. 13, 2011

(30) Foreign Application Priority Data

Dec. 26, 2008  (JP) .................................. 2008-333971

(51) Int. Cl.
*B60R 21/0136*  (2006.01)
(52) U.S. Cl.
USPC .............................. 701/45; 340/436; 180/274
(58) Field of Classification Search
None
See application file for complete search history.

(56) References Cited

U.S. PATENT DOCUMENTS 4,922,596 A * 5/1990 Wycech ........................ 29/897.2
4,978,562 A * 12/1990 Wycech ........................ 428/35.8
(Continued)

FOREIGN PATENT DOCUMENTS

| JP | 02-249740 | 10/1990 |
|---|---|---|
| JP | 05-093735 | 4/1993 |
| JP | 2000-326808 | 11/2000 |
| JP | 2004-003938 | 1/2004 |

(Continued)

OTHER PUBLICATIONS

International Search Report in PCT/JP2009/068335 dated Jan. 26, 2010.

*Primary Examiner* — Michael J Zanelli
(74) *Attorney, Agent, or Firm* — Foley & Lardner LLP

(57) ABSTRACT

A vehicular collision detection apparatus mounted to a vehicle comprises: a door beam that is arranged in a partitioned region partitioned between a door outer panel of a vehicle door, and a door inner panel of the vehicle door, and is displaced in accordance with a deformation of the door outer panel at the time of a vehicular collision; a cylindrical member that is arranged in the partitioned region and is compressed by the door beam at the time of the displacement of the door beam; a sealed cavity provided to the cylindrical member; a pressure sensor configured to detect a pressure fluctuation of the cavity; a deriving portion configured to derive a displacement amount and displacement velocity of the door beam, based on the pressure fluctuation detected by the pressure sensor; and a determining portion configured to determine collision particulars of the vehicle based on the displacement amount and displacement velocity of the door beam derived by the deriving portion.

3 Claims, 9 Drawing Sheets

(56) References Cited

U.S. PATENT DOCUMENTS

| | | | |
|---|---|---|---|
| 5,281,780 A | 1/1994 | Haland | |
| 5,419,407 A * | 5/1995 | Meyer et al. | 180/274 |
| 5,547,216 A * | 8/1996 | Iwata et al. | 280/734 |
| 6,969,107 B2 * | 11/2005 | Omori et al. | 296/146.6 |
| 7,137,472 B2 | 11/2006 | Aoki | |
| 2007/0051599 A1 | 3/2007 | Takehara et al. | |
| 2007/0103283 A1 * | 5/2007 | Nonaka et al. | 340/436 |
| 2007/0114771 A1 | 5/2007 | Wanami et al. | |
| 2007/0145771 A1 * | 6/2007 | Tanaka et al. | 296/146.6 |
| 2007/0227797 A1 | 10/2007 | Takahashi et al. | |
| 2007/0227798 A1 | 10/2007 | Takehara et al. | |
| 2008/0258887 A1 | 10/2008 | Gelberi et al. | |
| 2009/0254238 A1 * | 10/2009 | Metzler | 701/29 |

FOREIGN PATENT DOCUMENTS

| | | |
|---|---|---|
| JP | 2007-071596 | 3/2007 |
| JP | 2007-137333 | 6/2007 |
| JP | 2007-269279 | 10/2007 |
| JP | 2007-290682 | 11/2007 |
| JP | 2008-037236 | 2/2008 |
| JP | 2008-080979 | 4/2008 |
| JP | 2008-087629 | 4/2008 |
| JP | 2008-525255 | 7/2008 |

* cited by examiner

VEHICULAR COLLISION DETECTION APPARATUS, OCCUPANT RESTRAINT SYSTEM, AND VEHICLE

BACKGROUND OF THE INVENTION

1. Field of the Invention

The present invention relates to a technique for detecting a vehicular collision.

2. Description of the Related Art

In prior art, a variety of vehicle impact sensors configured to detect the occurrence of a collision at the time of a vehicular accident are known. For example, in JP, A, 2007-71596, there is disclosed a technique for detecting the collision particulars of a vehicle using a pressure sensor. This pressure sensor disclosed in JP, A, 2007-71596, is arranged in a vehicle door cavity formed between a door outer panel and a door inner panel of the vehicle door, and detects the change in pressure within this door cavity. The difficulty in achieving a high level of airtightness within the door cavity partitioned by the door outer panel and the door inner panel, however, results in limited appropriate association of the pressure fluctuation within the door cavity and the collision particulars of the vehicle. In particular, in the event of a collision resulting in a large amount of vehicle deformation despite a low collision velocity, such as a pole collision in which the vehicle collides with a pole-like collision object, the time rate of change of pressure is small, resulting in the problem that the detection accuracy achieved by the pressure sensor decreases considerably when the airtightness of the door cavity is low.

SUMMARY OF THE INVENTION

Problem to be Solved by the Invention

The present invention was designed in light of the above, and it is therefore an object of the present invention to provide an effective technique for accurately detecting the collision particulars of a vehicle using a pressure sensor.

Means for Solving the Problems

The present invention is applied to resolve the above-described problems. While typically applicable to techniques for determining information related to a side collision that occurs on an automobile, the present invention can similarly be applied to techniques for detecting information related to a side collision that occurs on a vehicle other than an automobile. The term "vehicle" here includes a variety of vehicles, such as automobiles, trains, buses, and trucks.

The vehicular collision detection apparatus according to the present invention is an apparatus mounted to a vehicle comprising a displaced member, a compressed member, a cavity, a pressure sensor, a deriving portion, and a determining portion. Of these components, the deriving portion and determining portion may be individual processing elements or a single processing element.

The displaced member is a member that is arranged in a partitioned region between a door outer panel of a vehicle door and a door inner panel of the vehicle door, and displaced in accordance with the deformation of the door outer panel at the time of a vehicular collision. The displaced member used may be any of a variety of members arranged in the partitioned region between the door outer panel and the door inner panel, and typically includes at least one of the following: a reinforcement member arranged in the partitioned region to reinforce the vehicle door, an inner wall portion of the door outer panel, or an installation member installed to the reinforcement member or the door outer panel. In particular, use of a reinforcement member that extends lengthwise across an extensive range in the vehicle front-back direction is effective in reliably transmitting the deformation of the door outer panel to the displaced member regardless of the area on the vehicle door where the collision object collides.

The compressed member is arranged in the partitioned region between the door outer panel and the door inner panel, and compressed by the displaced member at the time of displacement of the displaced member. This compressed member is typically juncturally connected to the displaced member in the partitioned region. The term "juncturally connected" here includes a state in which the compressed member is connected in close contact with the displaced member, and a state in which the compressed member is connected with the displaced member across a space. The cavity is a sealed cavity provided to this compressed member. The pressure fluctuation of this cavity, particularly the pressure fluctuation when this cavity reduces in volume, is detected by the pressure sensor. Note that the term "sealed cavity" here may be a cavity section that is completely sealed and does not permit the air therein to leak into the partitioned region, or a cavity section that permits a slight amount of air therein to leak into the partitioned region to absorb the effects caused by atmospheric pressure and thermal expansion. In a case where the cavity is configured to permit a slight amount of air therein to leak into the partitioned region, a small open hole that passes through the cavity and partitioned region, that is an open hole provided with a diameter of a size that does not result in a predetermined amount of loss in cavity airtightness, is preferably used to control the air leakage.

The deriving portion has a function of deriving the displacement amount and displacement velocity of the displaced member based on the pressure fluctuation detected by the pressure sensor. The deriving portion typically stores in advance a database that associates data related to pressure fluctuation and data related to the displacement amount and displacement velocity of the displaced member, and derives the actual displacement amount and displacement velocity of the displaced member by reading from this database the displacement amount and displacement velocity corresponding to the pressure fluctuation actually detected. The determining portion has a function of determining the collision particulars of the vehicle based on the displacement amount and displacement velocity of the displaced member derived by the deriving portion. This determining portion typically determines that a vehicular collision has occurred or that there is a vehicular collision that requires activation of an activated device when the relationship between the displacement amount and displacement velocity of the displaced member is within a predetermined range defined in advance. On the other hand, the determining portion determines that a vehicular collision has not occurred or that there is not a vehicular collision that requires activation of an activated device in a case where the relationship between the displacement amount and displacement velocity of the displaced member is outside the predetermined range. The term "activated device" here may be a device for restraining a vehicle occupant via an airbag or seatbelt, or a device that outputs information related to the vehicular collision.

According to the vehicular collision detection apparatus of the present invention, a sealed cavity is further provided in the compressed member in the partitioned region between the door outer panel and door inner panel of the vehicle door as in the above configuration, and the pressure fluctuation of this cavity is detected by a pressure sensor. With this arrangement, the cavity pressure appropriately fluctuates in response to the displacement of the door outer panel at the time of a vehicular collision, making it possible to accurately detect the collision particulars of the vehicle using the pressure sensor. In particular, in the event of a collision resulting in a large amount of vehicle deformation despite a low collision velocity, such as in a case where the vehicle collides with a pole-like collision object, the time rate of change of pressure is small, resulting in the problem that the sensitivity achieved by the pressure sensor decreases considerably when the airtightness of the cavity for detecting pressure fluctuation is low. In response, according to the vehicular collision detection apparatus of the present invention, the pressure fluctuation of the sealed cavity is detected, thereby preventing a decrease in sensitivity of the pressure sensor even in a case such as a pole collision.

The vehicular collision detection apparatus according to another embodiment of the present invention is preferably configured to further comprise a guide mechanism. This guide mechanism is a mechanism that guides the compressed member so that the cavity collapses and decreases in volume in a predetermined direction defined in advance when the compressed member is compressed by the displaced member. According to such a configuration, directionality is imparted by the guide mechanism so that the direction in which the cavity collapses after the compressed member is compressed is always the same, thereby making it possible to stably detect the pressure using the pressure sensor. Note that examples of possible configurations include a configuration wherein a cylindrical member that forms a cavity with its cylinder wall serves as the compressed member and an accordion-shaped folded portion provided to the cylinder wall of the cylindrical member serves as the guide mechanism, and a configuration wherein a piston member compressed by the displaced member serves as the compressed member and a cylinder member that guides the movement of this piston member and forms a cavity with the piston member serves as the guide mechanism.

According to the vehicular collision detection apparatus of yet another embodiment of the present invention, the compressed member is preferably a cylindrical member that forms a cavity with its cylinder wall that extends between the door inner panel and displaced member. In addition, the guide mechanism is an accordion-shaped folded portion that is provided to the cylinder wall of the cylindrical member, and preferably guides the cylindrical member so that the cavity collapses and decreases in volume along the extending direction of the cylinder wall. With such a configuration, the rigidity of the cylinder wall itself of the cylindrical member regulates the collapse of the cavity in relation to the direction that crosses the cylinder wall, and the accordion-shaped folded portion provided to the cylinder wall permits the collapse of the cavity in relation to the extending direction of the cylinder wall, causing the cavity to readily decrease in volume. With such a configuration, the provision of the accordion-shaped folded portion to the cylinder wall of the cylindrical member making it possible to achieve a simple structure that comprises the compressed member and guide mechanism in a single component.

The occupant restraint system of the present invention comprises at least the vehicular collision detection apparatus described above, an occupant restraint device that restrains a vehicle occupant, and a drive controller that controls the drive of the occupant restraint device based on the determination result of the determining portion of the vehicular collision detection apparatus at the time of a vehicular side collision. Examples of an "occupant restraint device" termed here typically include an airbag device (airbag module) that restrains an occupant using an airbag which deploys and inflates in an occupant restraint region, or a seatbelt device that restrains the chest and abdomen of an occupant seated in a vehicle seat via a seatbelt. In this case, when the airbag device is used as the occupant restraint device, the airbag device employed may have an airbag housed in the seat, pillar, or upper roof rail, for example. In addition, the drive controller that controls the drive of the occupant restraint device may be a controller that exclusively controls the occupant restraint device, or a controller that further controls other control targets (such as the engine driving system or electrical equipment system of the vehicle) in addition to the occupant restraint device. According to such a configuration, the present invention provides an occupant restraint system capable of controlling the occupant restraint device based on the determination result of the collision particulars of a vehicle accurately detected using the pressure sensor of the above-described vehicular collision detection apparatus.

The vehicle according to the present invention includes an engine driving system, electrical equipment system, control device, vehicle door, collision determination device, occupant restraint device, and drive controller. The engine driving system functions as a system related to the driving of the engine and vehicle. The electrical equipment system functions as a system related to the electrical components used in the vehicle. The control device functions as a device having the function of controlling the drive of the engine driving system and electrical equipment system. The vehicle door functions as the door used by the occupant to get in and out of the vehicle and has a door outer panel that is displaced as the result of a side collision. The collision determination device functions as a device for determining the particulars of a side collision of the vehicle door. This collision determination device comprises the above-described vehicular collision detection apparatus. The occupant restraint device, similar to the aforementioned occupant restraint device, functions as an occupant restraint device that restrains a vehicle occupant. The drive controller, similar to the aforementioned controller, fulfills the function of controlling the drive of the occupant restraint device based on the determination result of the collision determination device at the time of a vehicular side collision. According to such a configuration, the present invention provides a vehicle comprising an occupant restraint device that is controlled based on the determination result of the collision particulars of a vehicle accurately detected using a pressure sensor of the above-described vehicular collision detection apparatus.

Advantages

According to the present invention, it is possible to accurately detect the collision particulars of a vehicle using a pressure sensor.

DETAILED DESCRIPTION OF PREFERRED EMBODIMENTS

An occupant restraint system 100 according to an embodiment of the "occupant restraint system" of the present invention will now be described with reference to FIG. 1 to FIG. 5. According to this embodiment, an airbag module capable of deploying and inflating an airbag toward an occupant restraint region at the time of an accident is employed as the occupant restraint device that restrains the occupant. This airbag module is installed for the driver's seat, passenger's seat, rear seats, etc.

Figure 1:
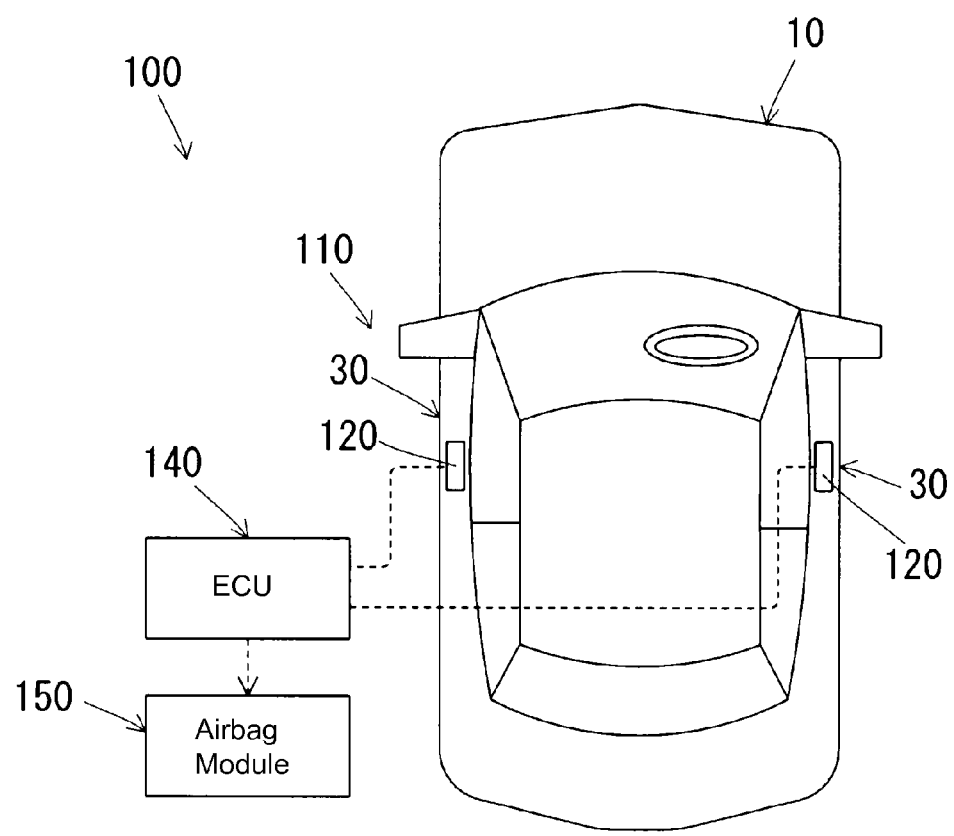
FIG. 1 is a view schematically showing the state in which an occupant restraint system of the embodiment is mounted to a vehicle occupied by a vehicle occupant.

FIG. 1 schematically shows the state of the occupant restraint system 100 of this embodiment when it is mounted in a vehicle 10 occupied by a vehicle occupant. The vehicle 10 serving as the "vehicle" of the present invention, while not particularly shown, comprises a large number of vehicle components that make up the vehicle, an engine driving system that serves as a system related to the driving of the engine and vehicle, an electrical equipment system that serves as a system related to the electrical components used in the vehicle, and drive controlling means configured to control the drive of the engine driving system and electrical equipment system.

This occupant restraint system 100 is a system that controls the prompt restraint of a vehicle occupant at the time of a side collision accident of the vehicle 10, based on information related to the side collision. As shown in FIG. 1, this occupant restraint system 100 comprises at least a vehicular collision detection apparatus 110, an ECU 140, and an airbag module 150.

The vehicular collision detection apparatus 110, while described in detail later, comprises a pressure sensor 120 that is mounted to a vehicle door 30, and functions as a device for detecting pressure information related to collision particulars of the vehicle 10 via a pressure sensor 120. The vehicular collision detection apparatus 110 here is equivalent to the "vehicular collision detection apparatus" of the present invention.

The ECU 140 has a function of outputting a drive control signal to the airbag module 150 based on the pressure information detected via the air pressure sensor 120. This ECU 140 may be a part of the control unit that serves as the control device (equivalent to the "control device" of the present invention) configured to control the engine driving system and electrical equipment system of the vehicle.

The airbag module 150, while not particularly shown, comprises at least an airbag and a gas supply device. The airbag is a member that is typically formed into a bag shape by fabric and capable of inflation and deflation. This airbag deploys and inflates in an occupant restraint region by the supply of gas from the gas supply device when the gas supply device is activated based on the drive control signal outputted from the ECU 140. With this arrangement, the airbag of the airbag module 150 is capable of restraining the vehicle occupant at the time of a vehicular accident. This airbag module 150 is an airbag device of a form in which an airbag for restraining an occupant is suitably housed in a seat, pillar, upper roof rail, or the like. The airbag module 150 here functions as a device configured to restrain a vehicle occupant at the time of a vehicular side collision, and is equivalent to the "occupant restraint device" of the present invention.

Figure 2:
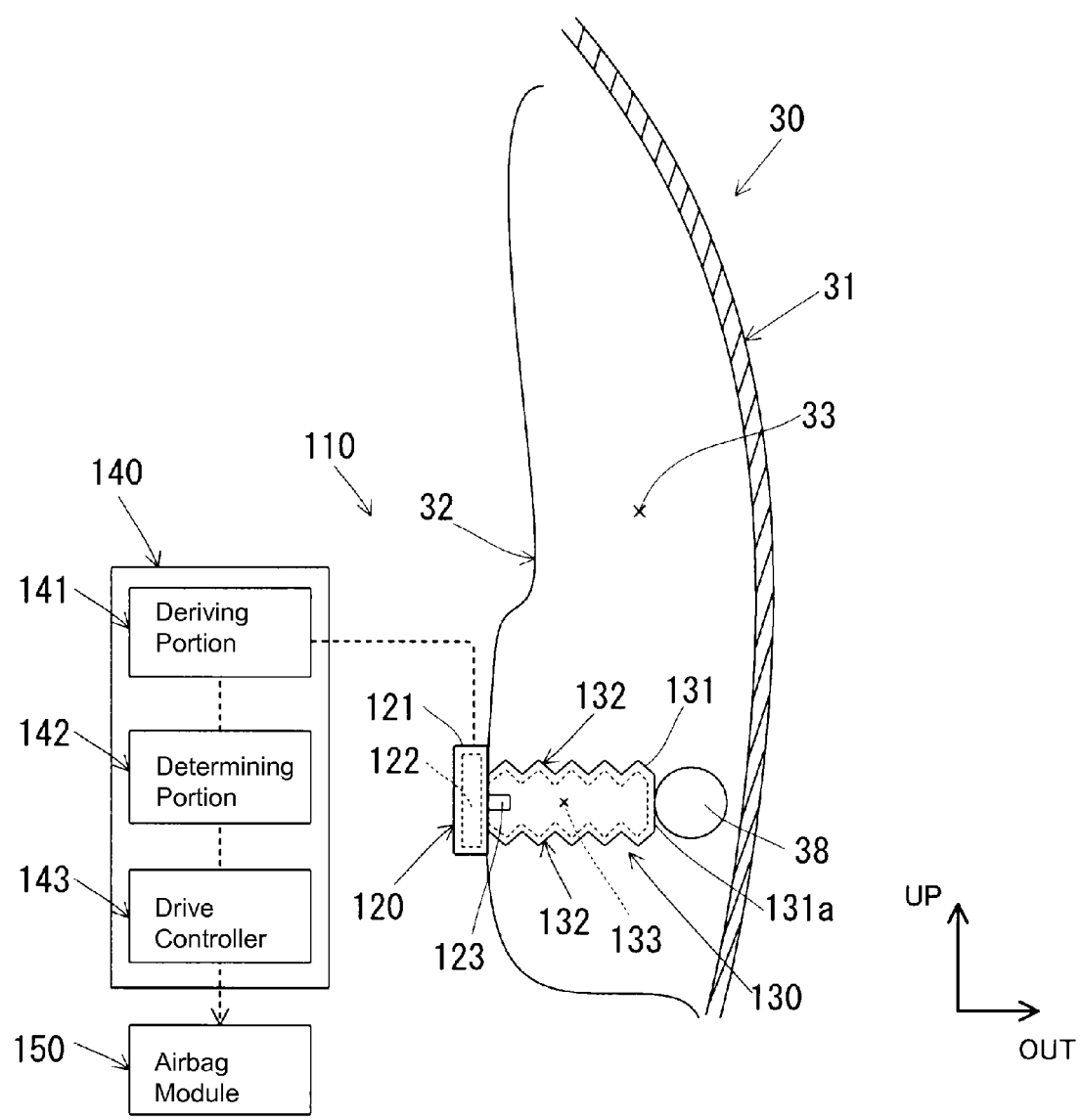
FIG. 2 is a view showing the longitudinal cross-sectional structure of the vehicle door where the pressure sensor of FIG. 1 is installed.
Figure 3:
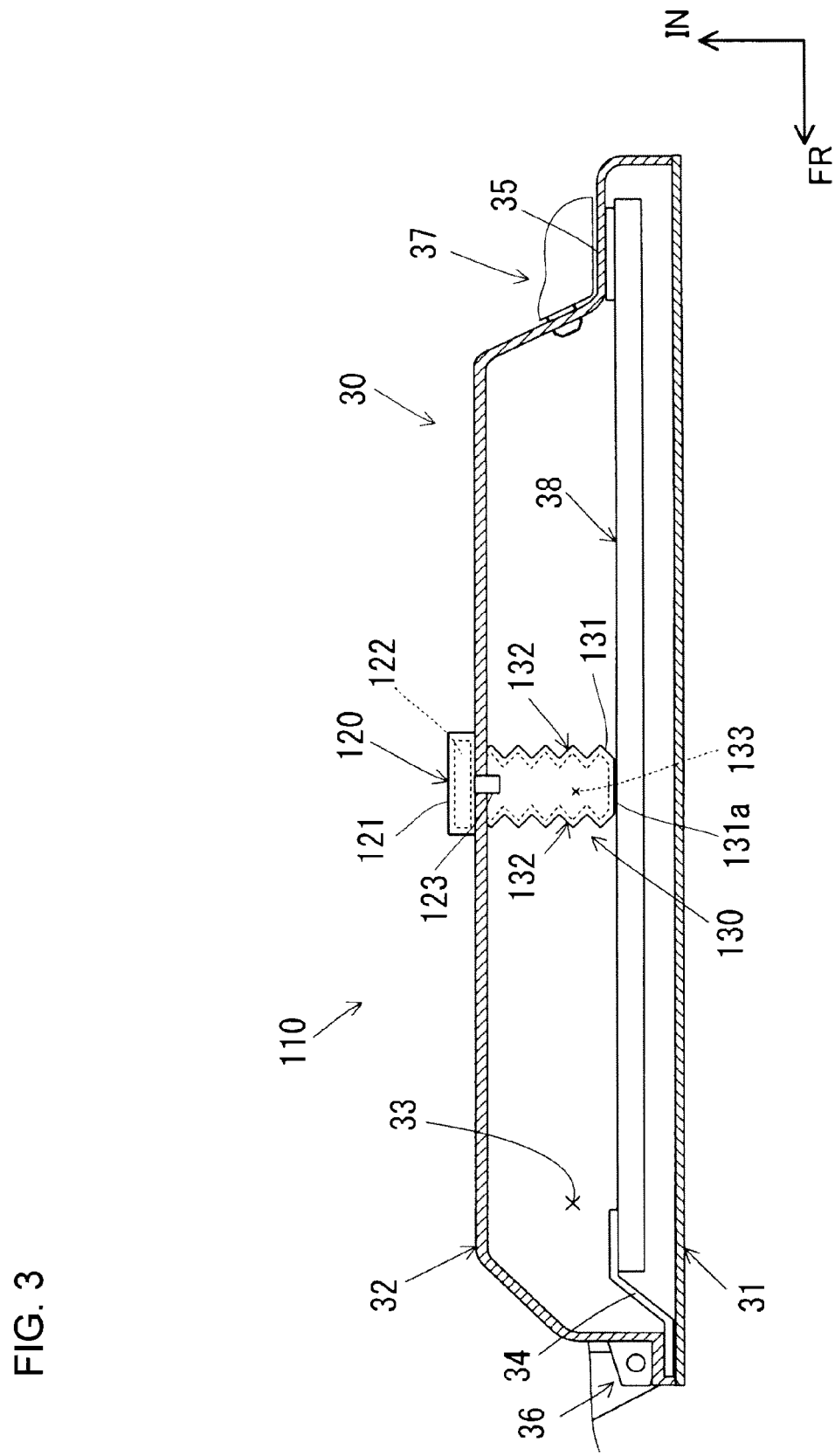
FIG. 3 is a view showing the lateral cross-sectional structure of the vehicle door of FIG. 2.
Figure 4:
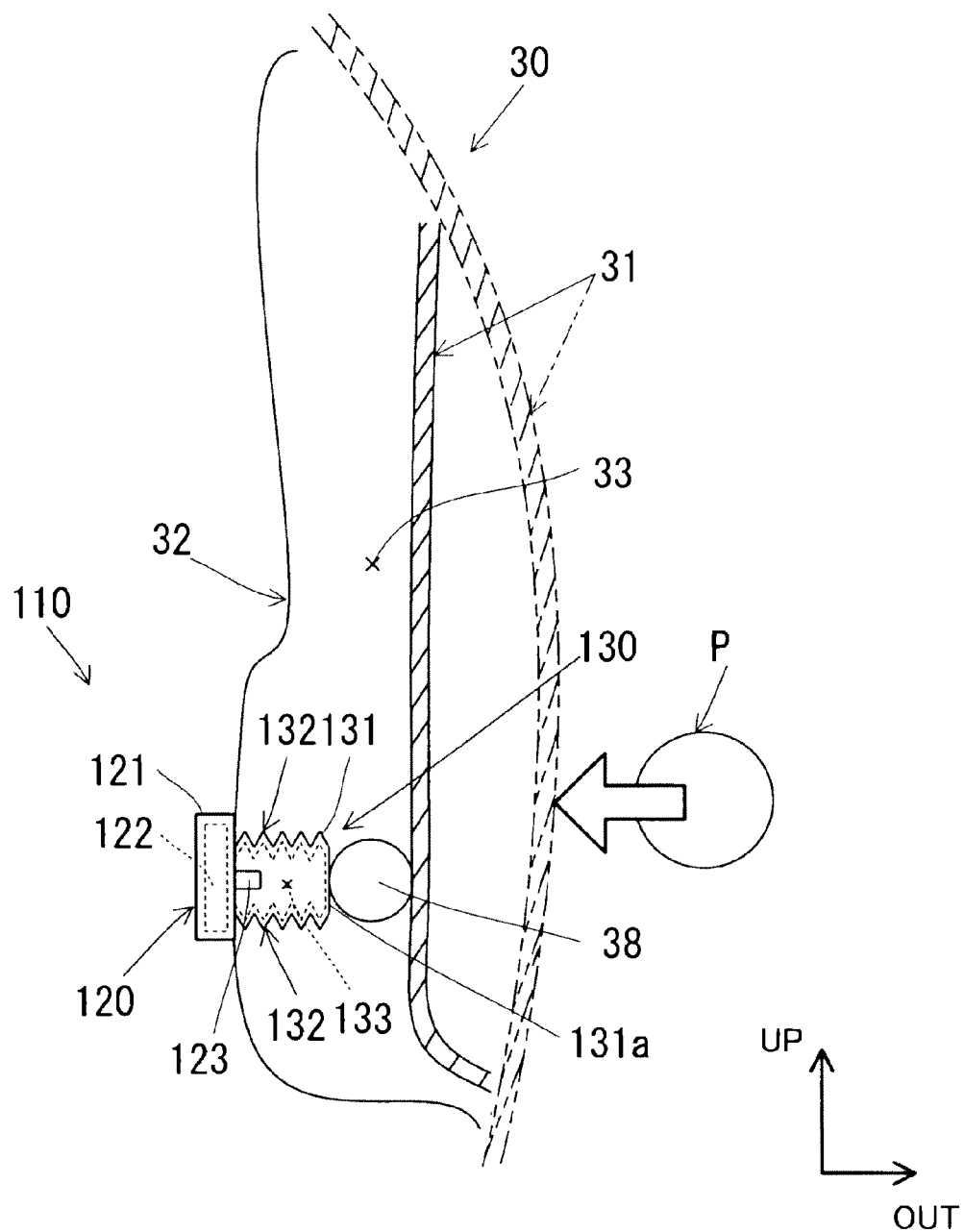
FIG. 4 is a view showing the motion of the cylindrical member at the time of a vehicular side collision, in the vertical cross-sectional structure of the vehicle door of FIG. 2.

Next, further details of the vehicular collision detection apparatus 110 and the ECU 140 will be described with reference to FIG. 2 and FIG. 3. FIG. 2 shows the structure of a longitudinal cross-section of the vehicle door 30 in which the pressure sensor 120 of FIG. 1 is installed, and FIG. 3 shows the structure of the lateral cross-section of the vehicle door 30 of FIG. 2. In addition, FIG. 4 shows the motion of a cylindrical member 130 at the time of a side collision of the vehicle 10, within the longitudinal cross-sectional structure of the vehicle door 30 of FIG. 2. Note that the "UP," "FR," "IN," and "OUT" arrows in these figures refer to the upward, forward (advancing), inward (interior), and outward (exterior) directions of the vehicle, respectively.

As shown in FIG. 2 and FIG. 3, the vehicle door 30 of the vehicle 10 connects with a vehicle body 37 via a door hinge 36. This vehicle door 30 comprises a door outer panel 31 that forms the outer side wall of the vehicle, and a door inner panel 32 that forms the inner side wall of the vehicle. The vehicle door 30 may serve as a front seat door installed between pillar A and pillar B, or a rear seat door installed between pillar B and pillar C of the vehicle 10. A door beam 38 made of metal is installed as a door reinforcement member in a partitioned region 33 between the door outer panel 31 and the door inner panel 32. The vehicle door 30, the door outer panel 31, the door inner panel 32, and the partitioned region 33 here are equivalent to the "vehicle door," "door outer panel," "door inner panel," and "partitioned region" of the present invention, respectively.

This door beam 38 is a long cylinder, rod, or pillar shaped member that extends long in shape in the vehicle front-back direction and is fixed to the vehicle body 37 via a vehicle front side bracket 34 on one end, and to the vehicle body 37 via a vehicle rear side bracket 35 on the other end. That is, this door beam 38 is installed lengthwise between the door front end portion (vehicle front side bracket 34) and the door rear end portion (vehicle rear side bracket 35) in the vehicle front-back direction, with both ends corresponding to the brackets 34 and 35 being fixed. This door beam 38 functions as a displaced member that absorbs the impact caused by displacement into a bent shape in association with the deformation of the door outer panel 31 at the time of a side collision of the vehicle 10. The door beam 38 here is equivalent to the "displaced member" of the present invention. In addition, this door beam 38 is also referred to as a "reinforcement member for reinforcing the vehicle door 30" or a "construction member constructed in the front-back direction of the vehicle door 30."

The cylindrical member 130 is arranged in the partitioned region 33 between the door outer panel 31 and the door inner panel 32, connected to this door beam 38. The cylindrical member 130 may be directly connected in close contact with or connected at a predetermined interval or across a space to the door beam 38. This cylindrical member 130 is a member compressed by the door beam 38 displaced at the time of a side collision of the vehicle 10. Specifically, this cylindrical member 130 is a closed-end cylinder-shaped member comprising a cylinder wall 131 that forms a sealed cavity 133 with the pressure sensor 120, and extends between the door inner panel 32 and the door beam 38. This cylindrical member 130 is made of material such as a metal or resin material, as necessary.

An accordion-shaped folded portion 132 is provided to the cylinder wall 131 of this cylindrical member 130. This folded portion 132 functions as a member that permits horizontal expansion and contraction of the cylindrical member 130 (contraction in the direction toward the vehicle interior and expansion in the direction toward the vehicle exterior). This folded portion 132 at least fulfills the function of guiding the cylindrical member 130 so that the cavity 133 decreases in volume in a direction toward the vehicle interior defined in advance, particularly when the bottom of the cylindrical member 130, that is, an end portion 131a facing the door outer panel 31, is compressed by the door beam 38.

As shown in FIG. 4, at the time of a side collision of the vehicle 10 with a collision object P, the door inner panel 32 deforms from the initial state indicated by the chain double-dashed line to a deformed position indicated by the solid line, causing the door beam 38 that bends toward the vehicle interior (the left side in FIG. 4) along with the door inner panel 32 to compress the cylindrical member 130. Then, as a result of this compression, the cylindrical member 130 contracts toward the vehicle interior via the folded portion 132, causing the cavity 133 to collapse toward the vehicle interior and decrease in volume. At this time, the collapse of the cavity 133 is regulated in relation to the direction crossing the cylinder wall 131 by the rigidity of the cylinder wall 131 itself of the cylindrical member 130, and permitted to occur in the direction toward the cylinder wall 131 by the accordion-shaped folded portion 132 provided to the cylinder wall 131, causing the cavity 133 to readily decrease in volume. The cylindrical member 130 here is equivalent to the "compressed member" and "cylindrical member" of the present invention, and the cylinder wall 131, the folded portion 132, and the cavity 133 of this cylindrical member 130 are equivalent to the "cylinder wall," "folded portion (guide mechanism)," and "cavity" of the present invention, respectively.

The pressure sensor 120 is a diaphragm-type pressure sensor where a sensor element comprising a diaphragm portion 122 of a thin shape is housed within a sensor housing 121. This pressure sensor 120 detects the change in pressure based on the change in the resistance value that occurs due to the distortion when pressure acts in the thickness direction of the diaphragm portion 122. According to this embodiment, the pressure acts in the thickness direction of the diaphragm portion 122 via a continuous portion 123 that passes between the cavity 133 and the pressure sensor 120 of the cylindrical member 130. With this arrangement, the pressure fluctuation that occurs when the cavity 133 of the cylindrical member 130 decreases in volume at the time of a side collision of the vehicle 10 is detected by the pressure sensor 120. This pressure sensor 120 is directly installed or indirectly installed via a bracket to the door inner panel 32, the door outer panel 31, the door beam 38, and the like. The pressure sensor 120 here is equivalent to the "pressure sensor" of the present invention.

The detected signal detected by the pressure sensor 120 is transmitted to the ECU 140 and suitably processed. The ECU 140 comprises a CPU (central processing unit), input/output device, storage device, drive device, peripheral devices, and the like, and at least has a deriving portion 141, a determining portion 142, and a drive controller 143, as shown in FIG. 2.

The deriving portion 141 fulfills the function of deriving the displacement amount and displacement velocity of the door beam 38 at the time of a side collision of the vehicle 10 based on the pressure fluctuation detected by the pressure sensor 120. The deriving portion 141 here is equivalent to the "deriving portion" of the present invention. This deriving portion 141 typically stores in advance data related to pressure fluctuation and a database that associates the displacement amount and displacement velocity of the door beam 38. Then, the deriving portion 141 derives the actual displacement amount and displacement velocity of the door beam 38 by reading from this database the displacement amount and displacement velocity corresponding to the pressure fluctuation actually detected.

The determining portion 142 fulfills a function of determining the collision particulars of the vehicle 10 based on the displacement amount and displacement velocity of the door beam 38 derived by the deriving portion 141. The determining portion 142 here is equivalent to the "determining portion" of the present invention. This determining portion 142 typically determines that a collision of the vehicle 10 has occurred or that there is a vehicular collision that requires activation of the airbag module 150 when the relationship between the displacement amount and displacement velocity of the door beam 38 is within a predetermined range defined in advance. On the other hand, the determining portion 142 determines that a collision of the vehicle 10 has not occurred or that there is not a collision that requires activation of airbag module 150 in a case where the relationship between the displacement amount and displacement velocity of the door beam 38 is outside the predetermined range.

Then, the drive controller 143 outputs a drive control signal to the airbag module 150 in a case where the determining portion 142 has determined either that a collision of the vehicle 10 has occurred or that there is a collision that requires activation of the airbag module 150. With this arrangement, the airbag of the airbag module 150 deploys and inflates in the restraint region of the vehicle occupant, making it possible to restrain the vehicle occupant. The drive controller 143 here is equivalent to the "drive controller" of the present invention.

Note that, in this occupant restraint system 100, an occupant restraint device other than the airbag module 150 may be used as the occupant restraint device controlled by the drive control signal from the drive controller 143 of the ECU 140 in place of or in addition to the airbag module 150. Examples of occupant restraint devices other than the airbag module 150 include occupant restraint devices such as a seatbelt device, or a warning device that outputs a display and audio to warn occupants of a side collision.

With a configuration in which the pressure fluctuation of the partitioned region 33 between the door outer panel 31 and the door inner panel 32 of the vehicle door 30 is directly detected by the pressure sensor 120, it is difficult to achieve a high level of airtightness of the partitioned region 33, resulting in a limit to the accuracy of detection of the collision particulars of the vehicle. Here, in the vehicular collision detection apparatus 110 of this embodiment, the sealed cavity 133 is further provided to the partitioned region 33 partitioned by the door outer panel 31 and the door inner panel 32, and the pressure fluctuation of this cavity 133 is detected by the pressure sensor 120.

With this arrangement, the pressure of the cavity 133 fluctuates in appropriate accordance with the displacement of the door outer panel 31 at the time of a vehicular collision, making it possible to accurately detect the collision particulars of the vehicle 10 using the pressure sensor 120. In particular, while in the event of a collision resulting in a large amount of vehicle deformation despite a low collision velocity, such as in a case where the vehicle collides with a pole-like collision object, the time rate of change of pressure decreases, resulting in the problem that the sensitivity achieved by the pressure sensor decreases considerably when the airtightness of the cavity for detecting pressure fluctuation is low, the present embodiment prevents the decrease in sensitivity of the pressure sensor, even in a case of pole collision, by using the sealed cavity 133. Such an operation and effect will now be further described with reference to FIG. 5.

Figure 5:
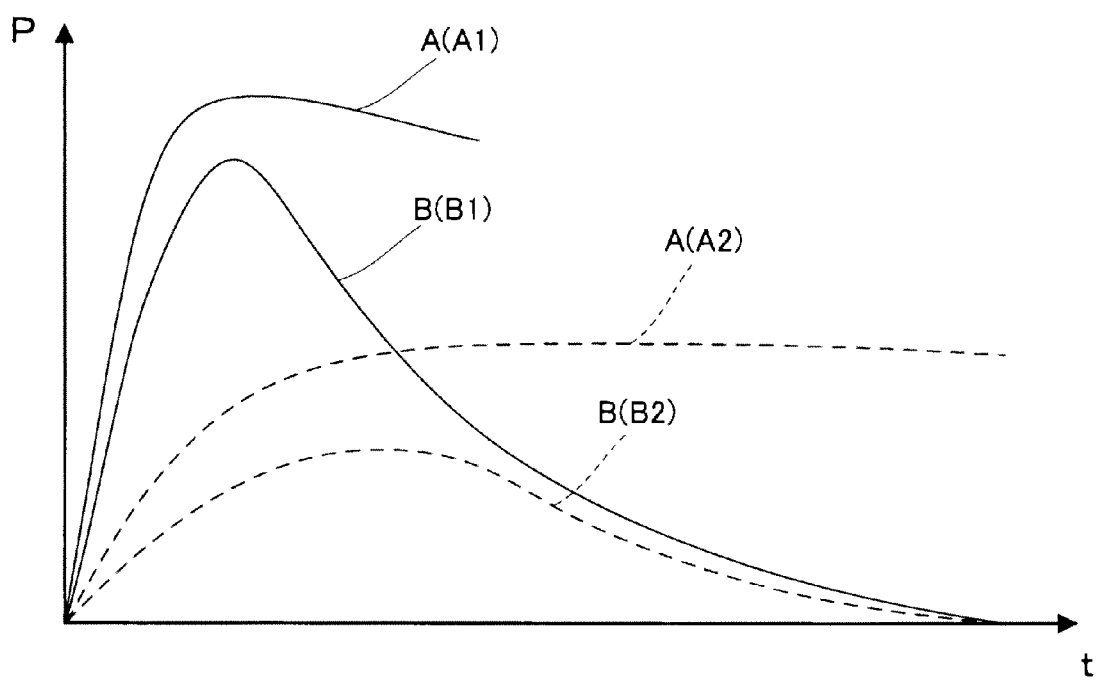
FIG. 5 is a view showing an overview of the change in pressure over time in the pressure detection region for embodiment A and comparison example B.

FIG. 5 shows an overview of the pressure change over time (vertical axis: pressure P, horizontal axis: time t) in the pressure detection region for a case where the vehicular collision detection apparatus 110 of this embodiment is used, that is, for a case where the pressure of the cavity 133 of the cylindrical member 130, which serves as the pressure detection region, is detected (embodiment A), and for a case where the pressure of the partitioned region 33 of the vehicle door 30, serving as the pressure detection region, is detected (comparison example B). In FIG. 5, curve A1 indicates the state at the time of a high-velocity collision in which the collision velocity of the collision object of embodiment A is relatively high, and curve A2 indicates the state at the time of a low-velocity collision in which the collision velocity is about half that at the time of the high-velocity collision of embodiment A. In addition, curve B1 indicates the state at the time of a high-velocity collision in which the collision velocity of the collision object of comparison example B is relatively high, and curve B2 indicates the state at the time of a low-velocity collision in which the collision velocity is about half that at the time of the high-velocity collision of comparison example B.

As shown in FIG. 5, according to comparison example B, the airtightness of the pressure detection region is low compared to that of embodiment A, and thus the pressure sensitivity decreases when the time rate of change of the pressure is small, particularly at the time of a low velocity collision. Conversely, according to embodiment A, it is understood that the airtightness of the pressure detection region is high, and thus the decrease in pressure sensitivity can be suppressed, even in a case where the time rate of change of pressure is small, particularly at the time of a low velocity collision.

In addition, according to the vehicular collision detection apparatus 110 of the above configuration, the accordion-shaped folded portion 132 is provided to the cylinder wall 131 of the cylindrical member 130, thereby imparting directionality so that the deformation direction is always the same when the cylindrical member 130 deforms, making it possible to stably detect the pressure using the pressure sensor 120. Furthermore, since the configuration is designed so that the cylindrical member 130 is compressed and deformed by the door beam 38 that extends across an extensive range in the front-back direction of the vehicle door 30, the deformation of the door outer panel 31 can be reliably transmitted to the cylindrical member 130 via the door beam 38, regardless of the area of the vehicle door 30 with which the collision object collides.

Note that the configuration of the cylindrical member 130, the arrangement of the pressure sensor 120, and the like are not limited to the vehicular collision detection apparatus 110 of the configuration shown in FIG. 2, etc., allowing the design specifications and the like to be suitably changed as necessary. Vehicular collision detection apparatuses 210, 310, 410, and 510 of other embodiments of the "vehicular collision detection apparatus" of the present invention will now be described with reference to FIG. 6 to FIG. 9. Note that, in FIG. 6 to FIG. 9, the components that are identical to those in FIG. 2 are denoted using the same reference numerals, and descriptions thereof will be omitted.

Figure 6:
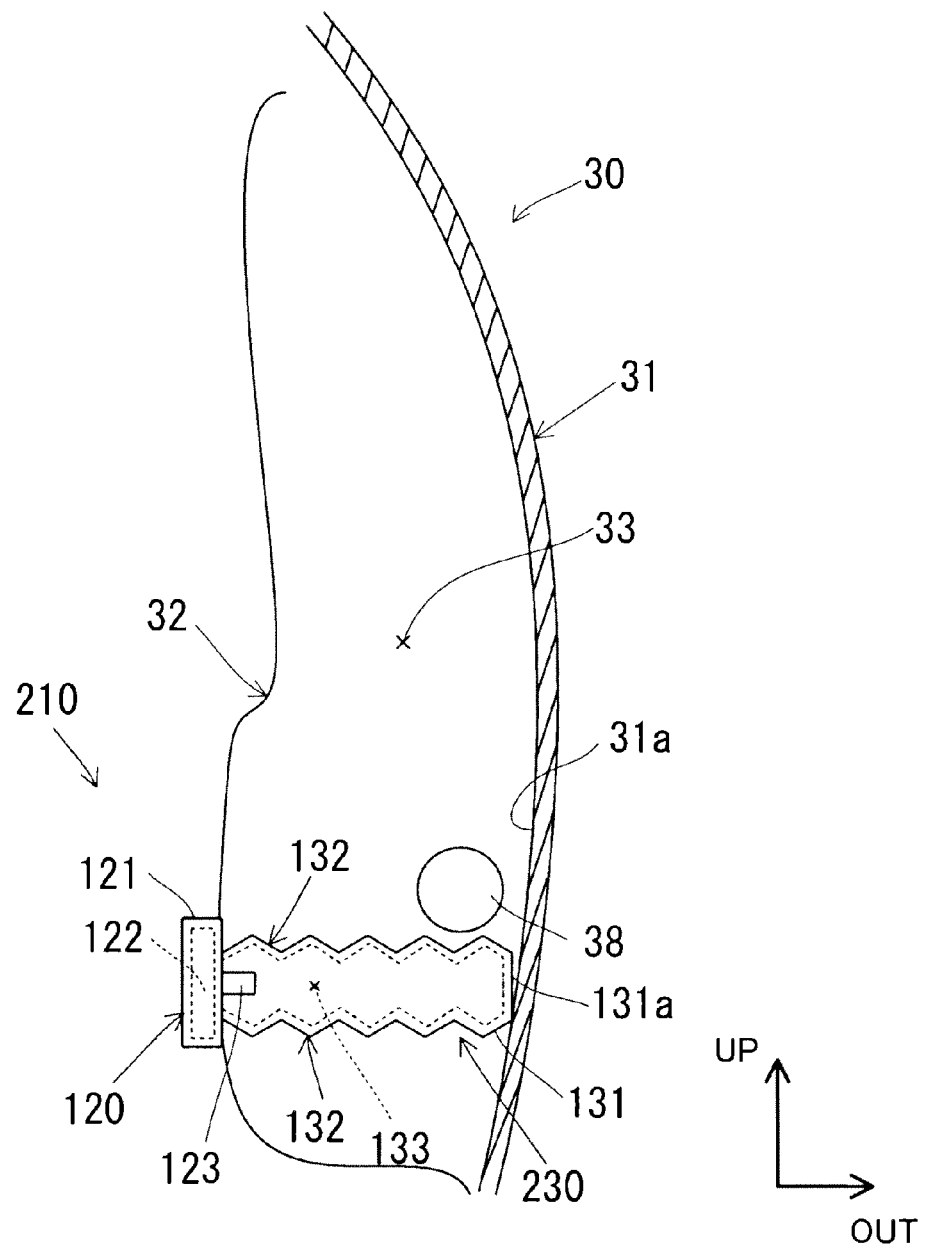
FIG. 6 is a view showing the lateral cross-sectional structure of the vehicle door in a case where the vehicular collision detection apparatus of another embodiment is employed.

According to the vehicular collision detection apparatus 210 of another embodiment shown in FIG. 6, the door outer panel 31 is employed as the displaced member that compresses a cylindrical member 230. That is, this cylindrical member 230 is not compressed by the door beam 38, but rather functions as a compressed member directly compressed by the door outer panel 31. Specifically, at the time of a side collision of the vehicle 10, the end portion 131a of the cylindrical member 230 is compressed by an inner wall surface 31a of the door outer panel 31, that is, by the wall surface opposite the door inner panel 32.

Figure 7:
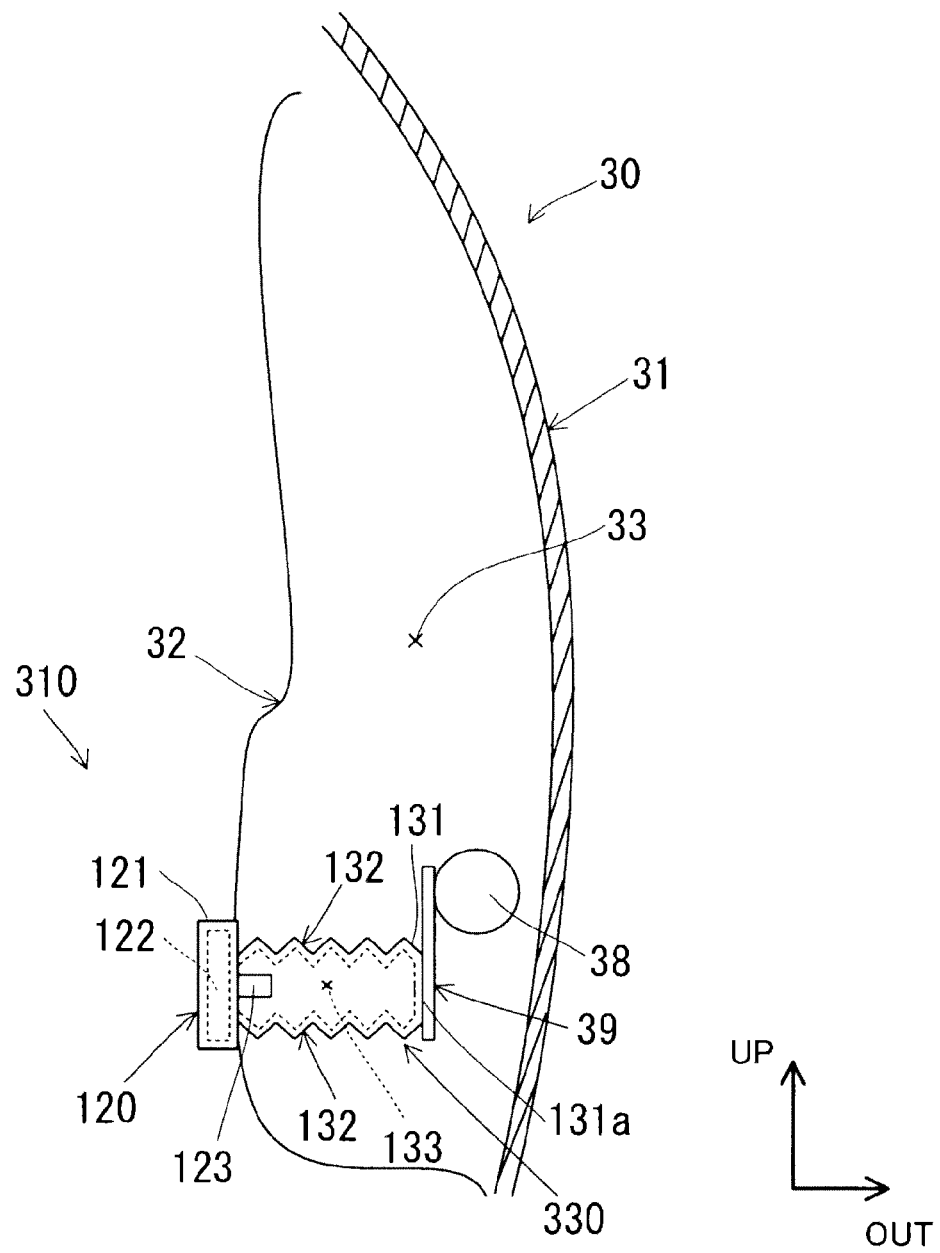
FIG. 7 is a view showing the lateral cross-sectional structure of the vehicle door in a case where the vehicular collision detection apparatus of another embodiment is employed.

In addition, according to the vehicular collision detection apparatus 310 of yet another embodiment shown in FIG. 7, an installation member 39 installed to the door beam 38 is employed as the displaced member that compresses a cylindrical member 330. That is, this cylindrical member 330 is not directly compressed by the door outer panel 31 and the door beam 38, but rather functions as a compressed member that is indirectly compressed by the door beam 38 via the installation member 39. Specifically, at the time of a side collision of the vehicle 10, the end portion 131a of the cylindrical member 330 is compressed by the wall surface of the installation member 39 facing the door inner panel 32.

Figure 8:
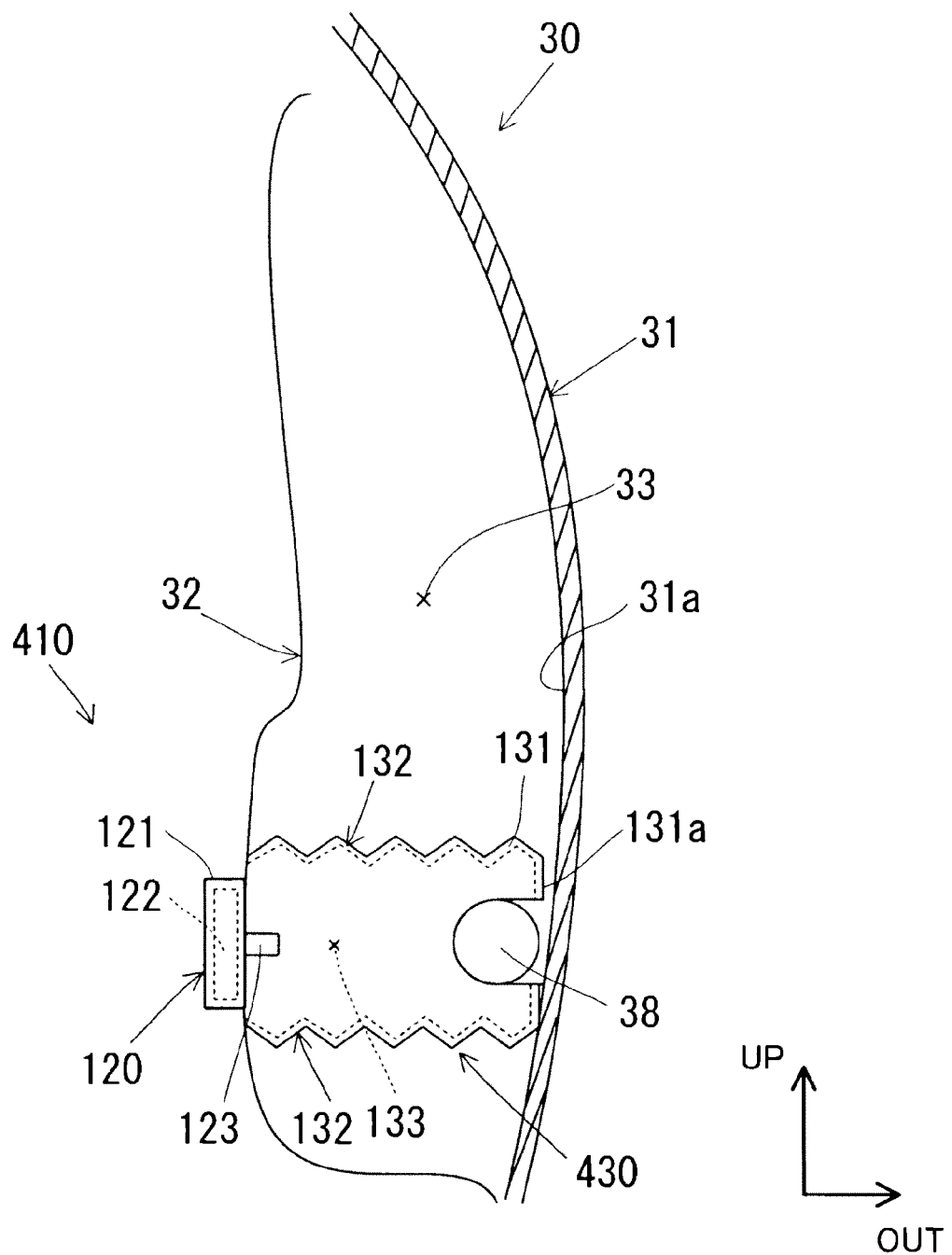
FIG. 8 is a view showing the lateral cross-sectional structure of the vehicle door in a case where the vehicular collision detection apparatus of another embodiment is employed.

In addition, according to the vehicular collision detection apparatus 410 of yet another embodiment shown in FIG. 8, both the door beam 38 and the door outer panel 31 are employed as displaced members that compress a cylindrical member 430. That is, this cylindrical member 430 functions as a compressed member that is directly compressed by the door beam 38 and the door outer panel 31. Specifically, at the time of a side collision of the vehicle 10, the end portion 131a of the cylindrical member 430 is compressed by the inner wall surface 31a of the door outer panel 31, that is, by the wall surface opposite the door inner panel 32, and an indented portion 131b formed on the end side of the cylindrical member 430 is compressed by the door beam 38.

Figure 9:
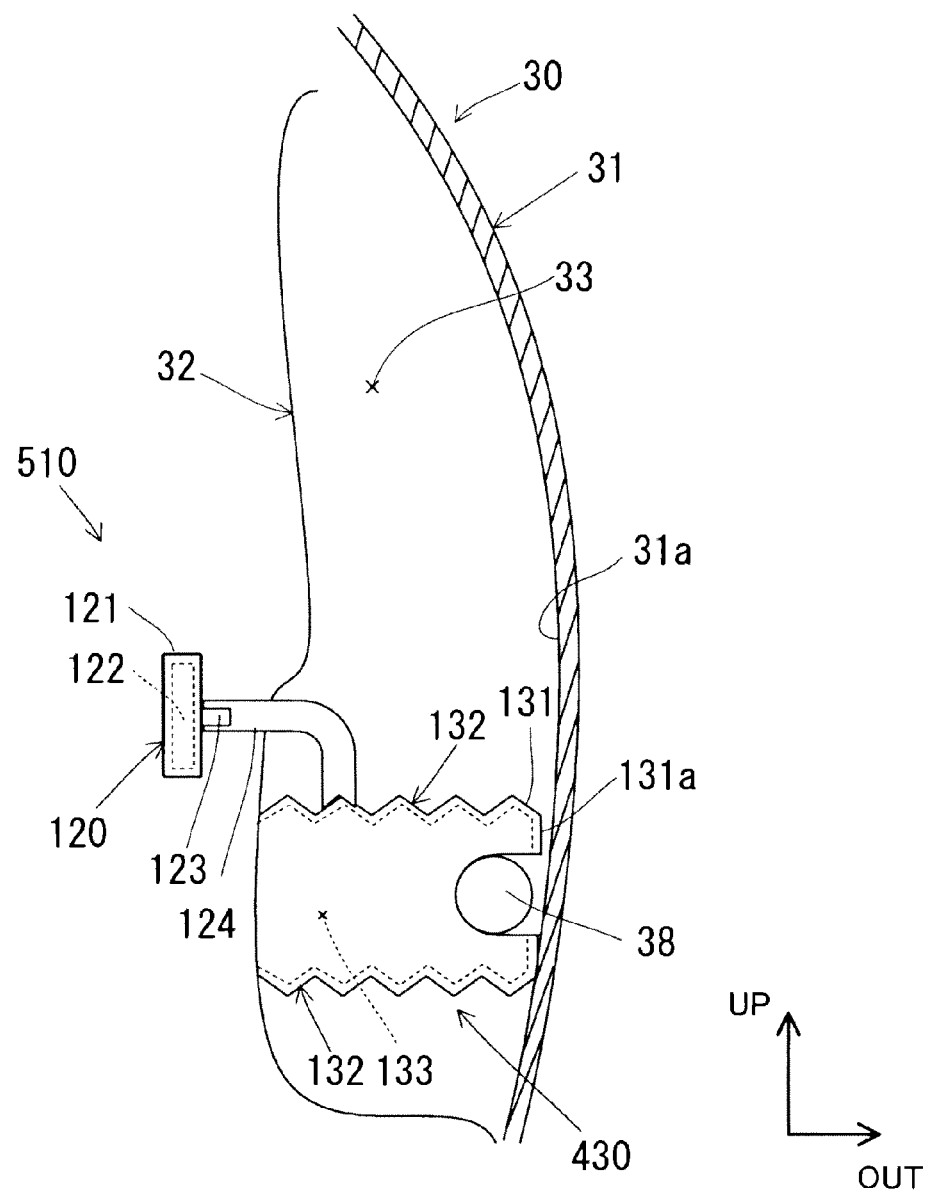
FIG. 9 is a view showing the lateral cross-sectional structure of the vehicle door in a case where the vehicular collision detection apparatus of another embodiment is employed.

Further, the vehicular collision detection apparatus 510 of yet another embodiment shown in FIG. 9 is a further modification of the vehicular collision detection apparatus 410. According to this vehicular collision detection apparatus 510, the configuration employs a design in which the pressure sensor 120 is arranged at a location away from the door inner panel 32, and the continuous portion 123 of the pressure sensor 120 passes through a pressure lead-through pipe 124, directly connecting with the cavity 133 of the cylindrical member 430.

Even in a case where the vehicular collision detection apparatus 210, 310, 410, or 510 is employed, the collision particulars of the vehicle 10 can be accurately detected using the pressure sensor 120, similar to a case where the vehicular collision detection apparatus 110 is employed.

Other Embodiments

The present invention is not limited to the above-described embodiment only, and various applications and modifications are possible. For example, each of the following embodiments, which apply the above-described embodiment, may also be implemented.

While according to each of the above embodiments, the cylindrical member 130 is used as the compressed member compressed by a displaced member, such as the door beam 38 or the door outer panel 31, the present invention allows use of members other than the cylindrical member 130 as long as a sealed cavity can be formed in the partitioned region 33 between the door outer panel 31 and the door inner panel 32. For example, a piston member compressed by the displaced member and a cylinder that guides the movement of this piston member and forms a sealed cavity with the piston member may be used.

Further, in each of the above embodiment, a small-diameter open hole that permits a small amount of air movement (leakage) between the partitioned region 33 and the cavity 133 may be provided on the cylindrical member 130, 230, 330, or 430 to absorb the effects of atmospheric pressure and thermal expansion. In this case, the open hole is preferably provided with a diameter of a size that does not result in loss of the desired airtightness of the cavity 133. Air leakage through this open hole can be controlled. That is, the sealed cavity 133 of the cylindrical member 130, 230, 330, and 430 of each of the embodiments may be a cavity section that is completely sealed and does not permit the air of the cavity 133 to leak into the partitioned region 33, or a cavity section that permits a slight amount of air of the cavity 133 to leak into the partitioned region 33 to absorb the effects caused by atmospheric pressure and thermal expansion.

In addition, while the above-described embodiment employs the airbag module 150 that restrains the vehicle occupant using an airbag as the occupant restraint device, the present invention allows use of other occupant restraint devices in addition to or in place of the airbag module 150, such as a seatbelt device that restrains the chest and abdomen of an occupant seated in a vehicle seat.

Further, while the above-described embodiment describes the configuration of an occupant restraint system mounted to an automobile, the present invention can be applied to the configuration of an occupant restraint system mounted to various vehicles, including automobiles, trains, buses, or trucks.

What is claimed is:

1. A vehicular collision detection apparatus mounted to a vehicle comprising:
    a door beam that is arranged along a front-back direction of the vehicle in a partitioned region partitioned between a door outer panel of a vehicle door, and a door inner panel of the vehicle door, and is displaced along a width direction of the vehicle in accordance with a deformation of said door outer panel at the time of a vehicular collision;
    a cylinder wall that extends along the width direction of the vehicle between said door inner panel and said door beam in said partitioned region and is compressed along the width direction of the vehicle by said door beam at the time of the displacement of said door beam along the width direction of the vehicle;
    a folded portion of an accordion shape that guides the compression of said cylinder wall along the width direction of the vehicle at the time of displacement of said door beam;
    a cavity formed hermetically in said cylinder wall and that collapses along the width direction of the vehicle and decreases in volume at the time of the displacement of said door beam;
    a continuous portion arranged in said cylinder wall along the width direction of the vehicle;
    a pressure sensor arranged on one side from said continuous portion along the width direction of the vehicle configured to detect a pressure fluctuation due to the collapse of said cavity along the width direction of the vehicle via said continuous portion;
    a deriving portion configured to derive a displacement amount and displacement velocity of said door beam, based on the pressure fluctuation detected by said pressure sensor; and
    a determining portion configured to determine collision particulars of said vehicle based on the displacement amount and displacement velocity of said door beam derived by said deriving portion.

2. An occupant restraint system comprising:
    a vehicular collision detection apparatus according to claim 1;
    an occupant restraint device configured to restrain a vehicle occupant; and
    a drive controller configured to control the drive of said occupant restraint device based on a determination result of said determining portion of said vehicular collision detection apparatus at the time of a side collision of said vehicle.

3. A vehicle comprising:
    an engine driving system;
    an electrical equipment system;
    a control device configured to control said engine driving system and electrical equipment system;
    a vehicle door for occupant entry and exit that deforms at the time of a vehicular side collision;
    a collision determination device configured to determine side collision particulars of said vehicle door;
    an occupant restraint device configured to restrain a vehicle occupant; and
    a drive controller configured to control the drive of said occupant restraint device based on a determination result of said collision determination device at the time of a side collision of said vehicle; wherein:
    said collision determination device comprises the vehicular collision detection apparatus according to claim 1.

* * * * *